United States Patent
Cheon

(10) Patent No.: US 9,724,770 B2
(45) Date of Patent: Aug. 8, 2017

(54) CUTTING INSERT HAVING EIGHT MAIN CUTTING EDGES AND EIGHT WIPER EDGES AND CUTTING TOOL INCLUDING THE SAME

(71) Applicant: TAEGUTEC, LTD., Dalseong-gun, Daegu (KR)

(72) Inventor: Sung Kook Cheon, Daegu (KR)

(73) Assignee: TAEGUTEC LTD., Dalseong-gun, Daegu (KR)

( * ) Notice: Subject to any disclaimer, the term of this patent is extended or adjusted under 35 U.S.C. 154(b) by 269 days.

(21) Appl. No.: 14/451,924

(22) Filed: Aug. 5, 2014

(65) Prior Publication Data

US 2014/0341660 A1 Nov. 20, 2014

Related U.S. Application Data

(63) Continuation-in-part of application No. PCT/KR2013/000948, filed on Feb. 6, 2013.

(30) Foreign Application Priority Data

Feb. 8, 2012 (KR) .................. 10-2012-0012974

(51) Int. Cl.
*B23C 5/20* (2006.01)
*B23C 5/06* (2006.01)
(Continued)

(52) U.S. Cl.
CPC .......... *B23C 5/207* (2013.01); *B23B 27/1611* (2013.01); *B23C 5/06* (2013.01);
(Continued)

(58) Field of Classification Search
CPC ............ B23C 2200/12; B23C 2200/00; B23C 2200/08; B23C 2200/125; B23C 2200/126; B23C 2200/208; B23C 5/2221
See application file for complete search history.

(56) References Cited

U.S. PATENT DOCUMENTS

| | | | |
|---|---|---|---|
| 5,622,460 A * | 4/1997 | Satran ................... | B23C 5/1045 407/42 |
| 5,913,644 A | 6/1999 | DeRoche et al. | |
| | | (Continued) | |

FOREIGN PATENT DOCUMENTS

| | | |
|---|---|---|
| JP | 07-237025 | 9/1995 |
| JP | 08-039327 | 2/1996 |

OTHER PUBLICATIONS

International Search Report in PCT/KR2013/000948, dated Apr. 23, 2013.

*Primary Examiner* — Will Fridie, Jr.
(74) *Attorney, Agent, or Firm* — Womble Carlyle

(57) ABSTRACT

A double-sided cutting insert for milling which has eight main cutting edges and eight wiper edges. The cutting insert includes top and bottom faces and four side faces. Each side face includes first and second sub-faces inclined with respect to each other. The first sub-face has a main cutting edge adjacent to the top face and a wiper edge adjacent to the bottom face. The second sub-face has a wiper edge adjacent to the top face and a main cutting edge adjacent to the bottom face. The wiper edge of the second sub-face is inclined inwardly relative to the cutting insert with respect to the main cutting edge of the first sub-face. The wiper edge of the first sub-face is inclined inwardly relative to the cutting insert with respect to the main cutting edge of the second sub-face.

21 Claims, 15 Drawing Sheets

(51) Int. Cl.
  *B23C 5/10* (2006.01)
  *B23B 27/16* (2006.01)
(52) U.S. Cl.
  CPC ...... B23C 5/109 (2013.01); *B23C 2200/0455* (2013.01); *B23C 2200/125* (2013.01); *B23C 2200/203* (2013.01); *B23C 2200/208* (2013.01); *B23C 2210/163* (2013.01); *B23C 2210/40* (2013.01); *B23C 2210/66* (2013.01); *Y10T 407/1924* (2015.01); *Y10T 407/235* (2015.01)

(56) References Cited

U.S. PATENT DOCUMENTS

| | | | |
|---|---|---|---|
| 5,971,672 A | 10/1999 | Hansson | |
| 6,293,737 B1 * | 9/2001 | Satran | B23C 5/2221 407/113 |
| 6,543,970 B1 * | 4/2003 | Qvarth | B23C 5/202 407/114 |
| 7,232,279 B2 * | 6/2007 | Smilovici | B23C 5/2221 407/113 |
| 7,604,441 B2 * | 10/2009 | Bhagath | B23C 5/06 407/113 |
| 7,976,250 B2 * | 7/2011 | Fang | B23C 5/109 407/113 |
| 9,022,700 B2 * | 5/2015 | Bhagath | B23B 27/007 407/113 |
| 2010/0303563 A1 * | 12/2010 | Fang | B23C 5/109 407/113 |
| 2012/0275868 A1 * | 11/2012 | Saito | B23C 5/06 407/42 |
| 2013/0195566 A1 * | 8/2013 | Bhagath | B23C 5/207 407/33 |
| 2014/0341660 A1 * | 11/2014 | Cheon | B23C 5/06 407/42 |

* cited by examiner

CUTTING INSERT HAVING EIGHT MAIN CUTTING EDGES AND EIGHT WIPER EDGES AND CUTTING TOOL INCLUDING THE SAME

RELATED APPLICATIONS

This is a Continuation-in-part of Application No. PCT/KR2013/000948, filed 6 Feb. 2013 and published in English as WO 2013/119036A1 on 15 Aug. 2013, which claims priority to Korean application no. 10-2012-0012974, filed 8 Feb. 2012. The contents of the aforementioned applications are incorporated by reference in their entirety.

TECHNICAL FIELD

The present invention relates to a cutting insert for milling and a cutting tool including such a cutting insert. More particularly, the present invention relates to a double-sided cutting insert having eight main cutting edges and eight wiper edges, as well as a cutting tool including such a cutting insert.

BACKGROUND ART

Conventionally, double-sided indexable cutting inserts having eight main cutting edges and eight wiper edges have been used when machining a shoulder in a workpiece. When machining a shoulder in a workpiece by means of such a cutting insert, one main cutting edge and one wiper edge, which are located in two adjacent side faces of the cutting insert, are used. However, other cutting edges do not need to contact the workpiece.

FIG. 1 shows a prior art cutting insert 101. FIG. 2 shows a cutting tool 102 on which the cutting insert 101 is mounted. When the cutting insert 101 is mounted on the cutting tool 102 as shown in FIG. 2, an operative main cutting edge 112 and an operative wiper edge 116 cut a shoulder in a workpiece. To position a non-operative main cutting edge 118 away from a base wall of the shoulder, the cutting insert 101 is mounted on the cutting tool 102 as being rotated by approximately 1° around an axis perpendicular to a base surface of an insert pocket of the cutting tool 102. As a result, an upright wall of the shoulder cut by the cutting insert 101 forms an angle of approximately 89° with the base wall of the shoulder. Thus, the cutting insert 101 and the cutting tool 102 shown in FIGS. 1 and 2 cannot cut a right-angled shoulder in a workpiece. Further, if the depth of the shoulder to be cut is greater than a predetermined depth of cut D1, then a non-operative wiper edge 114 contacts the upright wall of the shoulder. Thus, the cutting insert 101 and the cutting tool 102 shown in FIGS. 1 and 2 cannot be used for cutting a shoulder having a depth greater than the predetermined depth of cut D1.

FIG. 3 shows another prior art cutting insert 201 disclosed in Korean Laid-Open Patent Publication No. 2010-0015837. FIG. 4 and FIG. 5 show a cutting tool 202 on which the cutting insert 201 shown in FIG. 3 is mounted. The cutting insert 201 has main cutting edges 204 and wiper edges 206. The height of the wiper edge 206 becomes greater as it goes away from a junction 208 with the main cutting edge 204. To ensure a relief angle during cutting operations, the cutting insert 201 is mounted on the cutting tool 202 as being rotated around an axis perpendicular to a base surface of an insert pocket of the cutting tool 202 and further being inclined with respect to a rotary axis RA of the cutting tool 202. Accordingly, when the cutting insert 201 mounted on the cutting tool 202 is viewed from front (see FIG. 5), a non-operative wiper edge 214 projects further outwardly of the cutting insert 201 than an operative main cutting edge 212. That is, as shown in FIG. 5, the non-operative wiper edge 214 forms an angle of approximately 88° with the base wall of the shoulder of the workpiece. When cutting a shoulder in a workpiece by means of such a cutting insert 201, the operative main cutting edge 212 and the operative wiper edge 216 can cut a right-angled shoulder only up to a predetermined depth of cut D2. When cutting a shoulder at a depth greater than the predetermined depth of cut D2, the non-operative wiper edge 214 contacts the upright wall of a shoulder. Thus, the aforementioned prior art cutting insert 201 cannot be used for cutting a right-angled shoulder having a depth greater than the predetermined depth of cut D2.

As such, the prior art cutting inserts and the cutting tools with such cutting inserts cannot cut a right-angled shoulder. Even if a right-angled shoulder can be cut by those cutting inserts and cutting tools, it can be cut only up to a limited depth.

DISCLOSURE OF INVENTION

Technical Problem

It is an object of the present invention to provide a cutting insert, which has eight main cutting edges and eight wiper edges and is capable of machining a deep right-angled shoulder in a workpiece. It is another object of the present invention to provide a cutting tool including such a cutting insert.

Solution to Problem

An exemplary embodiment of the present invention provides a double-sided cutting insert for milling, which has eight main cutting edges and eight wiper edges. The cutting insert includes a square top face when viewed from the top, a square bottom face 180-degree rotationally symmetric with the top face and four side faces extending between the top and bottom faces. Each side face includes first and second sub-faces that are inclined with respect to each other. The first sub-face has a main cutting edge adjacent to the top face and a wiper edge opposed to the main cutting edge and adjacent to the bottom face. The second sub-face has a wiper edge adjacent to the top face and a main cutting edge opposed to the wiper edge of the second sub-face and adjacent to the bottom face. The wiper edge of the second sub-face, when viewed from top, is inclined inwardly of the cutting insert with respect to the main cutting edge of the first sub-face. The wiper edge of the first sub-face, when viewed from bottom, is inclined inwardly of the cutting insert with respect to the main cutting edge of the second sub-face.

Advantageous Effects of Invention

The cutting insert of the embodiment has eight main cutting edges and eight wiper edges and is capable of cutting a deep right-angled shoulder in a workpiece without limitation to a depth of cut.

DETAILED DESCRIPTION OF THE DRAWINGS

Exemplary embodiments of the present invention will now be described with reference to the accompanying drawings.

Figure 1:
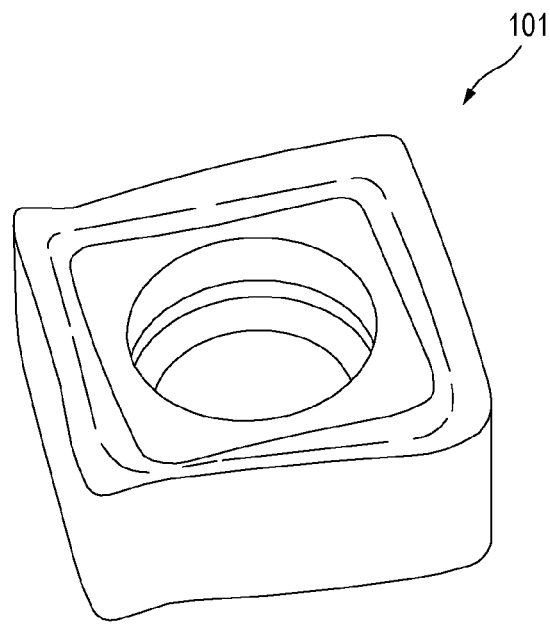
FIG. 1 shows a prior art cutting insert.
Figure 2:
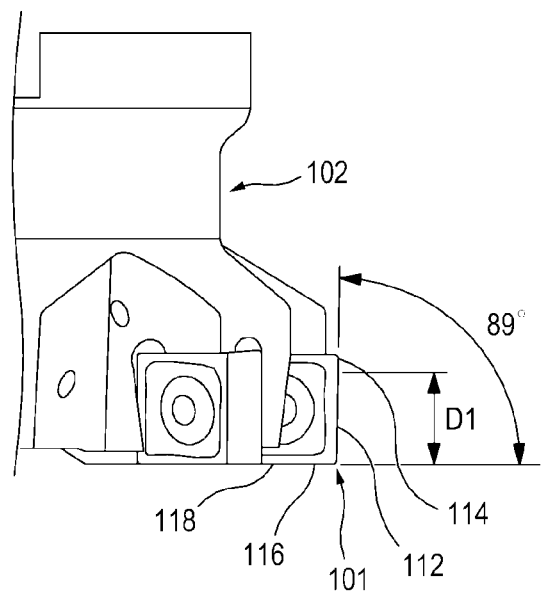
FIG. 2 shows a prior art cutting tool on which the cutting insert shown in FIG. 1 is mounted.
Figure 3:
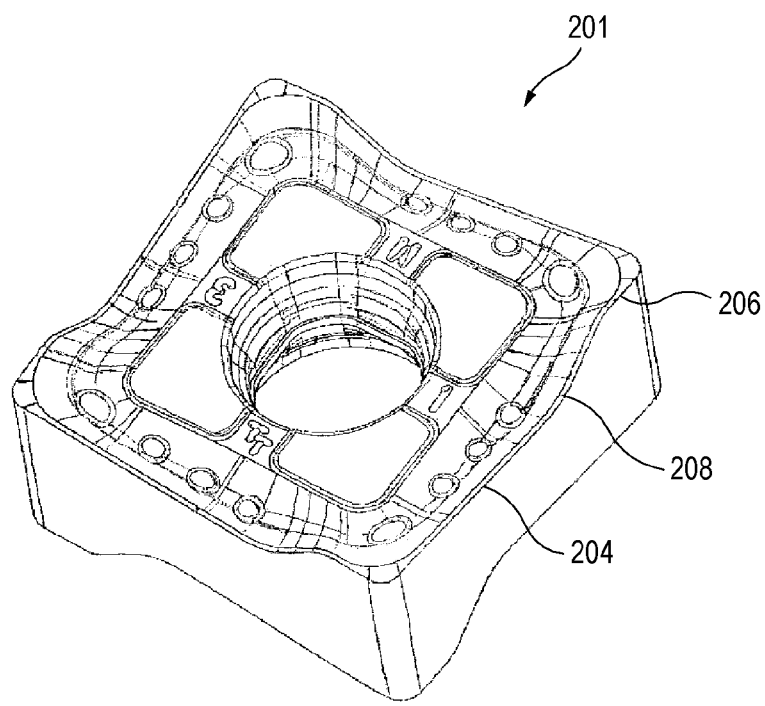
FIG. 3 shows another prior art cutting insert.
Figure 4:
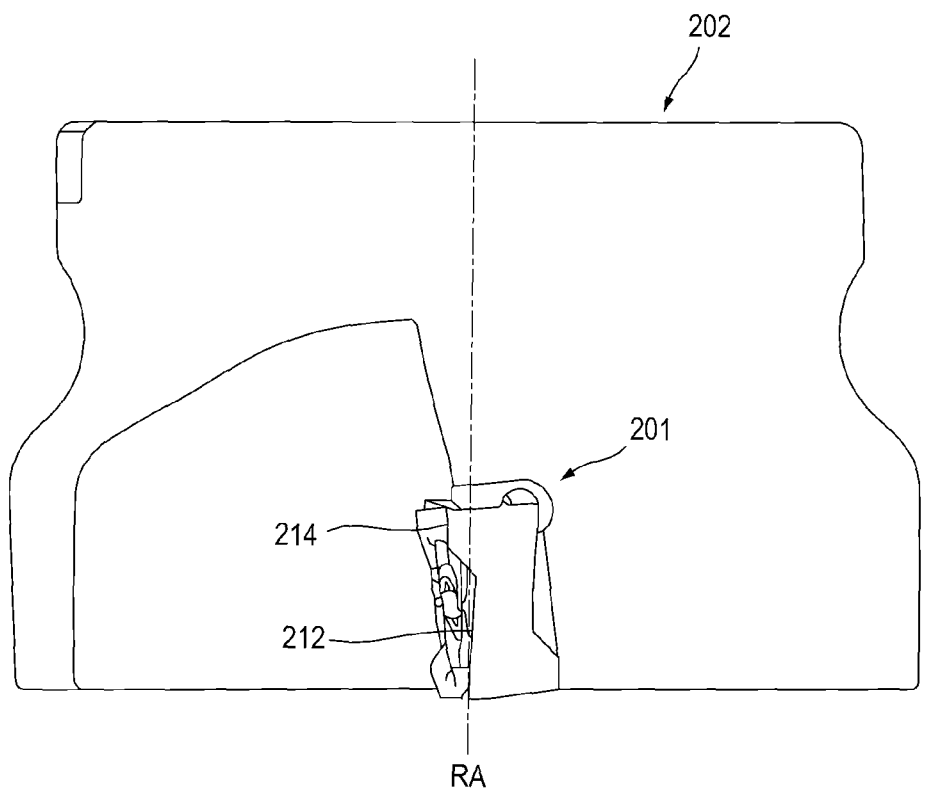
FIG. 4 shows another prior art cutting tool on which the cutting insert shown in FIG. 3 is mounted.
Figure 5:
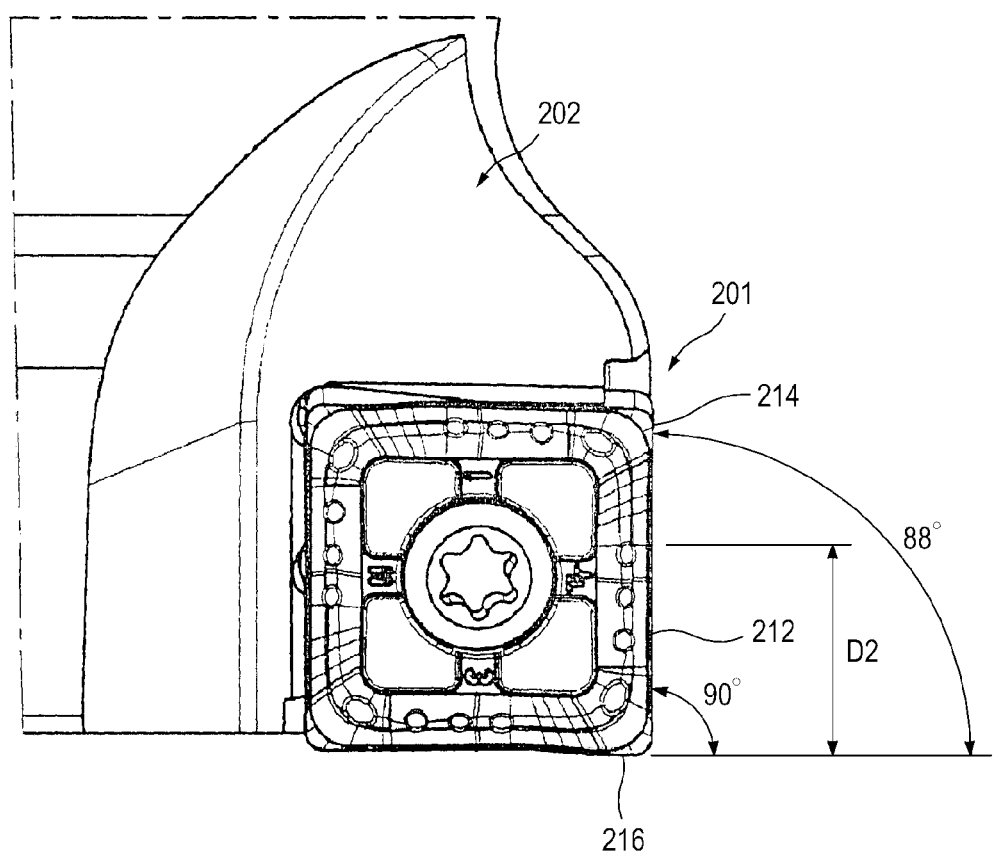
FIG. 5 is an enlarged view showing a portion of the cutting tool shown in FIG. 4, on which the cutting insert is mounted.
Figure 6:
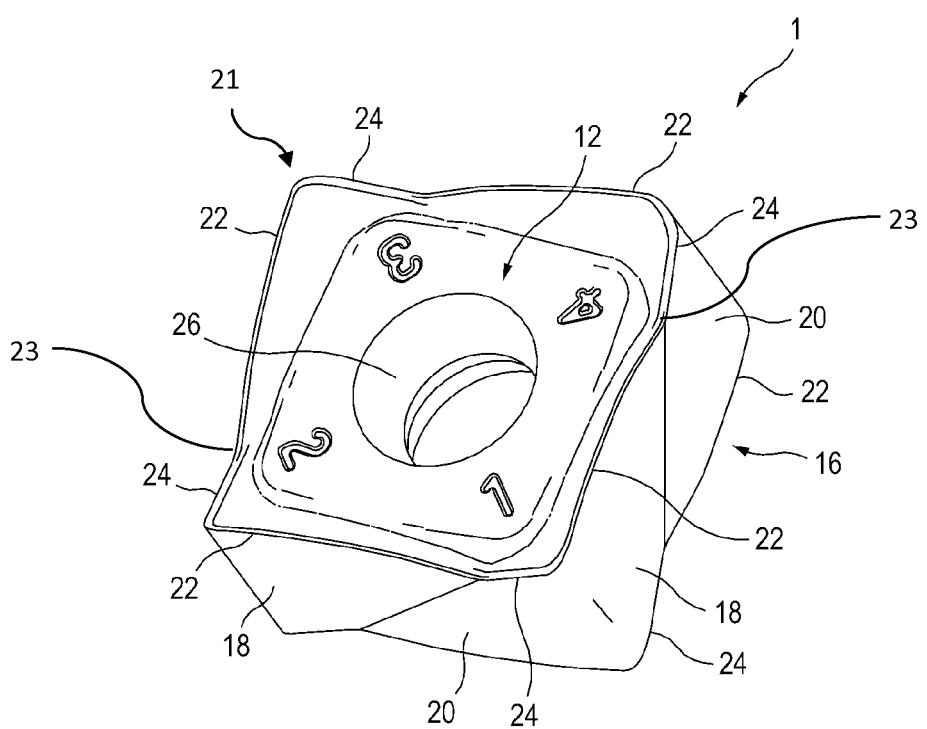
FIG. 6 is a perspective view of a cutting insert according to an embodiment of the present invention.
Figure 7:
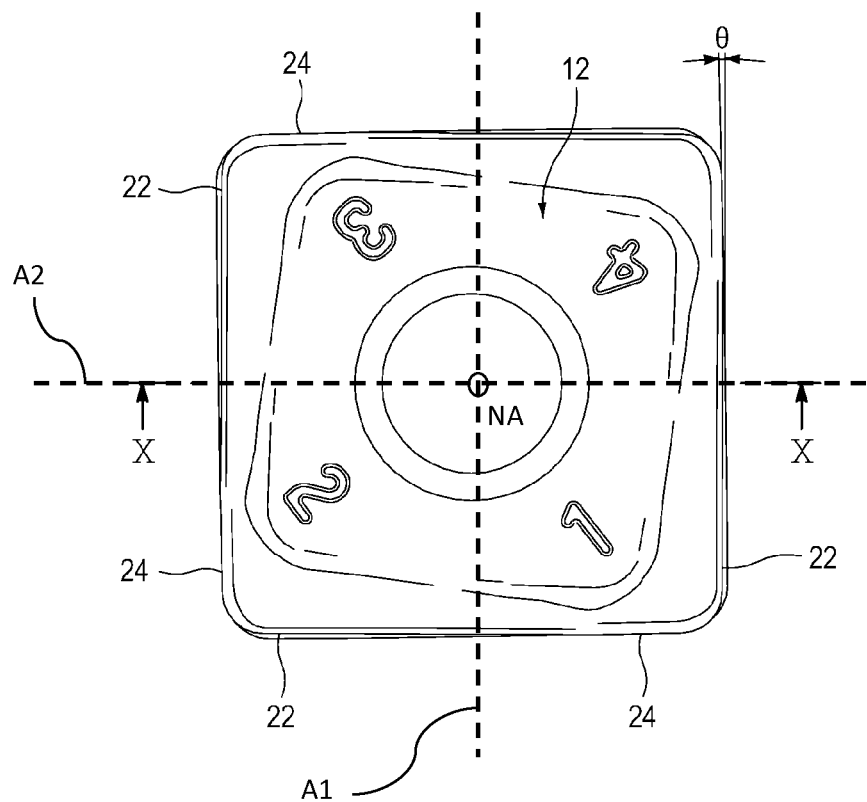
FIG. 7 is a top view of the cutting insert shown in FIG. 6.
Figure 8:
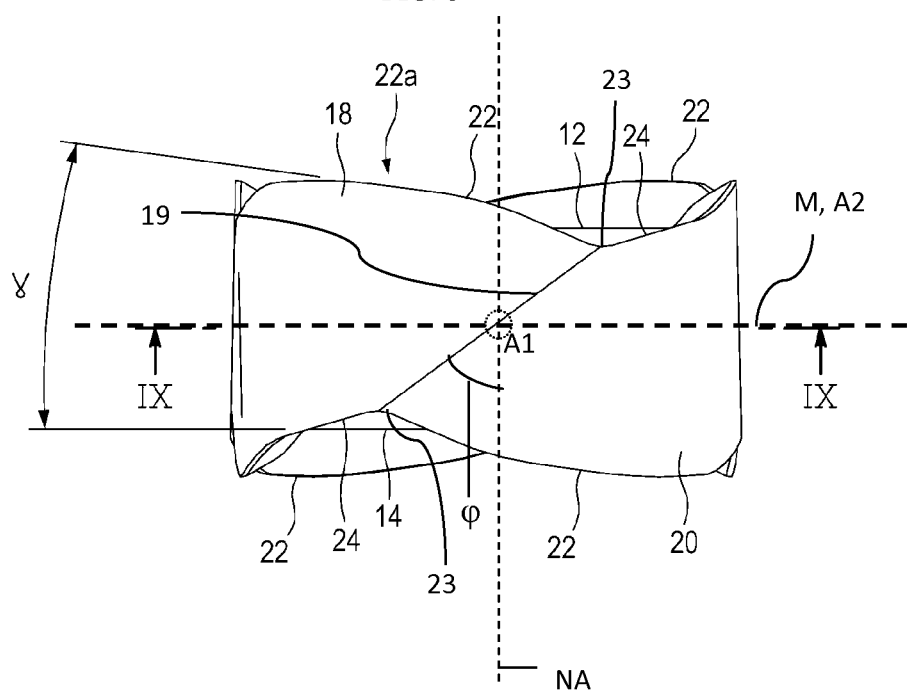
FIG. 8 is a front view of the cutting insert shown in FIG. 6.

FIGS. 6 to 8 are a perspective view, a top view and a front view of a cutting insert according to an embodiment, respectively. The cutting insert 1 may be used for milling operations, more particularly for machining a shoulder 42 in a workpiece 40 (see FIGS. 12 and 15) as mounted on a tool holder 2a, 2'a of a cutting tool 2, 2' (see FIGS. 11 and 14). The cutting insert 1 is substantially square in a top view. The cutting insert 1 has a top face 12 and a bottom face 14, which are substantially parallel to each other, and four side faces 16 extending between the top face 12 and the bottom face 14.

A median plane M is parallel to and equidistant between the top face 12 and the bottom face 14, bisecting each of the four side faces 16. A first axis A1 lies along the median plane M and passes through a first pair of opposite sides faces 16. A second axis A2 lines along the median plane M and passes through a second pair of opposite side faces 16. The first axis A1 is perpendicular to the second axis A2.

In this embodiment, the bottom face 14 is generally rotationally symmetric by 180 degrees with the top face 12 about both the first axis A1 and the second axis A2. The cutting insert 1 has eight main cutting edges 22 and eight wiper edges 24. More specifically, the side faces 16 of the cutting insert 1 have four main cutting edges 22 and four wiper edges 24 that are located adjacent to the top face 12, and four main cutting edges 22 and four wiper edges 24 that are located adjacent to the bottom face 14. Each main cutting edge 22 meets a wiper edge 24 of the same side face 16 at a transition point 23. Each main cutting edge 22 meets a wiper edge 24 of an adjacent side face 16 at a corner 21.

The cutting insert 1 includes a through bore 26 that receives a clamping means such as a screw for clamping the cutting insert 1 on the tool holder 2a, 2a'. A normal axis NA passes through middle of the through bore 26, normal to the top surface 12, the bottom surface 14 and the median plane M. It is understood that the cutting insert has four-way (90 degree) rotational symmetry about the normal axis NA.

When the cutting insert 1 cuts the shoulder 42 in the workpiece 40 as mounted on the tool holder 2a, 2'a, one main cutting edge 22 of one of the side faces 16 and one wiper edge 24 of another side face adjacent to said one of the side faces 16 are used. That is, in cutting operations using the cutting insert 1 mounted on the tool holder 2a, 2'a, one main cutting edge 22 and one wiper edge 24, which are adjacent and approximately perpendicular to each other, are used for machining a shoulder in a workpiece.

Each side face 16 of the cutting insert 1 comprises a first sub-face 18 and a second sub-face 20 that are inclined at a predetermined angle with respect to each other. The first sub-face 18 and the second sub-face 20 meet at a boundary 19. When the cutting insert 1 is viewed from the side as shown in FIG. 8, the boundary 19 is oblique with respect to the normal axis NA. In a side view, the boundary 19 forms an acute internal angle φ with the normal axis NA, in a side view of the insert. In some embodiments, φ is in the range of 50-60 degrees. The first sub-face 18 has the main cutting edge 22 located adjacent to the top face 12 and the wiper edge 24 located adjacent to the bottom face 14. The second sub-face 20 has the wiper edge 24 located adjacent to the top face 12 and the main cutting edge 22 located adjacent to the bottom face 14. The angle φ of the boundary 19 renders the main cutting edges 22 longer than the wiper edges 24. In words, the distance from a corner 21 to a transition point 23 is longer along a main cutting edge 22 than along a wiper edge 24.

Referring to FIG. 7, when viewing the cutting insert 1 from the top, the first sub-face 18 and the second sub-face 20 are inclined with respect to each other such that the wiper edge 24 of the second sub-face 20 is inclined inwardly of the cutting insert 1 at a predetermined angle θ with respect to the main cutting edge 22 of the first sub-face 18. In this embodiment, said angle θ at which the wiper edge 24 is inclined with respect to the main cutting edge 22, may be in a range of approximately 1 degree to approximately 3 degrees. Further, when viewing the cutting insert 1 from the bottom, the first sub-face 18 and the second sub-face 20 are inclined with respect to each other such that the wiper edge 24 of the first sub-face 18 is inclined inwardly of the cutting insert 1 with respect to the main cutting edge 22 of the second sub-face 20. When viewed from the top, the bottom face 14 is skewed relative to the top face 12 about the normal axis NA by an angle θ/2.

Figure 9:
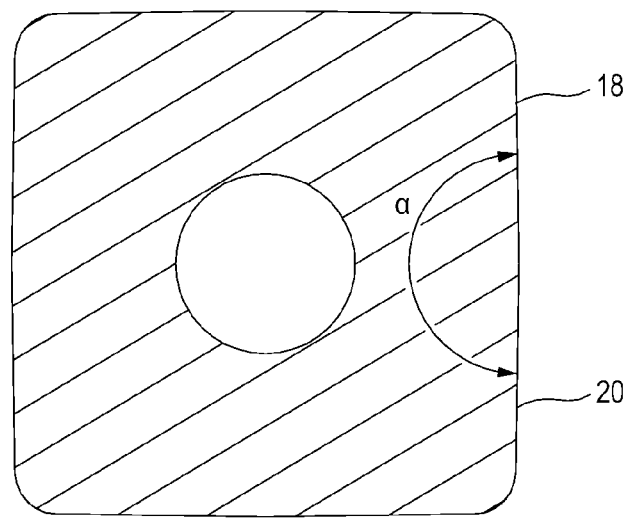
FIG. 9 is a sectional view along the line IX-IX of FIG. 8.

FIG. 9 is a sectional view along the line IX-IX of FIG. 8. The first sub-face 18 and the second sub-face 20 of the cutting insert 1 are inclined with respect to each other at an internal angle of α(α<180 degrees), thus imparting a convex shape to the side face 16. In this embodiment, said angle a between the first sub-face 18 and the second sub-face 20 may be in a range of approximately 177 degrees to approximately 179 degrees.

Figure 10:
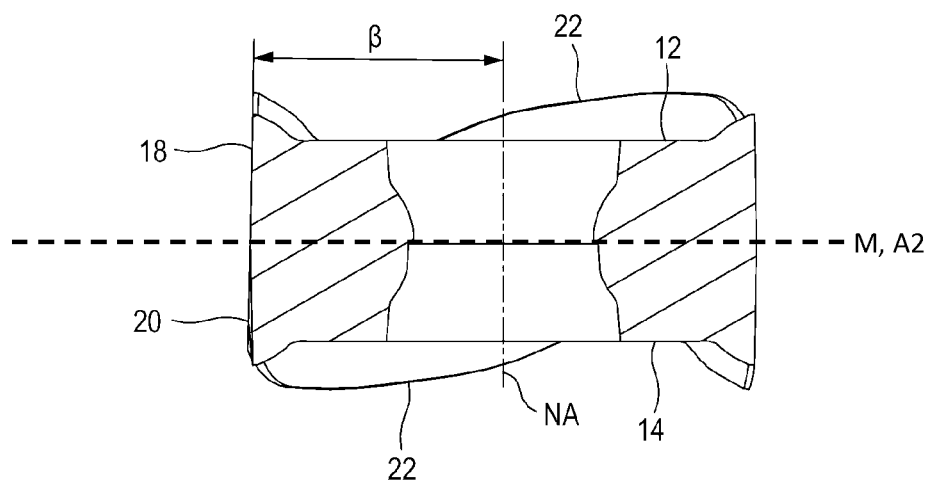
FIG. 10 is a sectional view along the line X-X of FIG. 7.

FIG. 10 is a sectional view along the line X-X of FIG. 7. The first and second sub-faces 18, 20 of the side face 16 of the cutting insert 1 are inclined at a predetermined angle of β(β>0 degrees) with respect to the normal axis NA of the top and bottom faces 12, 14.

Further, the main cutting edge 22 comprises a portion 22a that is inclined at a predetermined angle γ with respect to the top and bottom faces 12, 14 (see FIG. 8). More specifically, when viewing the cutting insert 1 from the side, the inclined portion 22a becomes closer to the top face 12 or the bottom face 14 as the main cutting edge 22 approaches to the wiper edge 24 on the same side face 16. This configuration of the main cutting edge 22 reduces the cutting resistance and noise when the main cutting edge 22 cuts a workpiece.

As seen in FIG. 8, when viewed from the side, the transition points 23 along the top and bottom faces 12, 14 are located closer to the median plane M than any other point along the main cutting edge 22 or the wiper edge 24. Further, when viewed from the side, the transition point 23 along the top face 12 is on one side of the normal axis NA and the transition point 23 along the bottom face 14 is on the other side of the normal axis NA.

Figure 11:
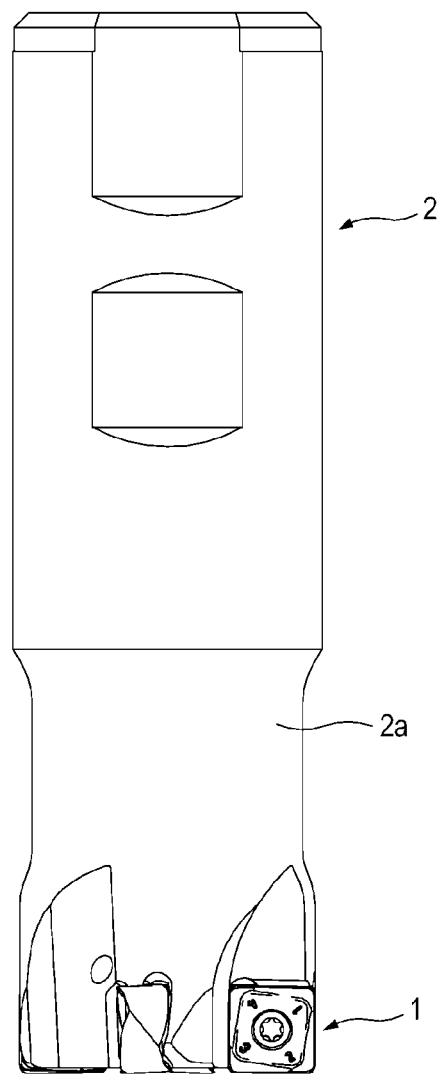
FIG. 11 shows a cutting tool for milling on which the cutting insert according to an embodiment is mounted.
Figure 12:
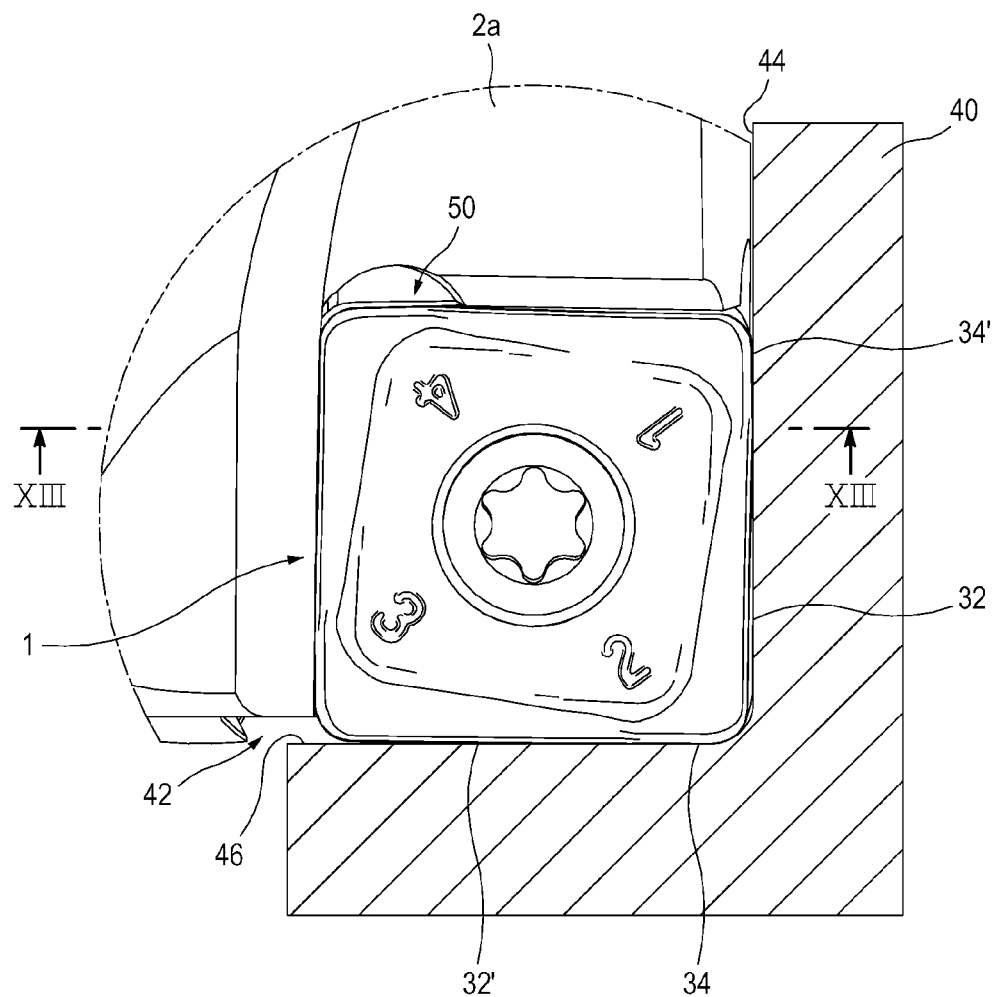
FIG. 12 is an enlarged view showing a shoulder cut in a workpiece and a portion of the cutting tool shown in FIG. 11 on which the cutting insert is mounted.

FIG. 11 shows a cutting tool for milling on which the cutting insert 1 of the embodiment is mounted. FIG. 12 shows a shoulder cut in a workpiece and a portion of the cutting tool shown in FIG. 11 on which the cutting insert 1 is mounted. The tool holder 2a of the cutting tool 2 includes at least one insert pocket 50 for mounting at least one cutting insert 1. In cutting operations using the cutting tool 2 wherein the cutting insert 1 is mounted on the insert pocket 50 of the tool holder 2a, an operative main cutting edge 32 of the cutting insert 1 cuts an upright wall 44 of the shoulder 42, while an operative wiper edge 34 of the cutting insert 1 cuts a base wall 46 of the shoulder 42. The upright wall 44 of the shoulder 42, which is cut by the operative main cutting edge 32, forms a right angle with the base wall 46 of the shoulder 42, which is cut by the operative wiper edge 34.

As described above, the side face 16 of the cutting insert 1 comprises the first and second sub-faces 18, 20 that are inclined with respect to each other. Thus, when the tool holder 2a on which the cutting insert 1 is mounted is viewed from the front, a non-operative wiper edge 34', which is located in the same side face 16 together with the operative main cutting edge 32, is inclined inwardly of the cutting insert 1 with respect to the operative main cutting edge 32. This configuration permits the non-operative wiper edge 34' to be not in contact with the upright wall 44 of the shoulder 42 when the cutting tool 2 cuts the workpiece 40 (see FIG. 12). Consequently, the cutting insert 1 according to the embodiment, which includes the first and second sub-faces 18, 20 inclined with respect to each other, and the cutting tool with such a cutting insert are capable of machining a deep right-angled shoulder without limitation to a depth of cut.

Figure 13:
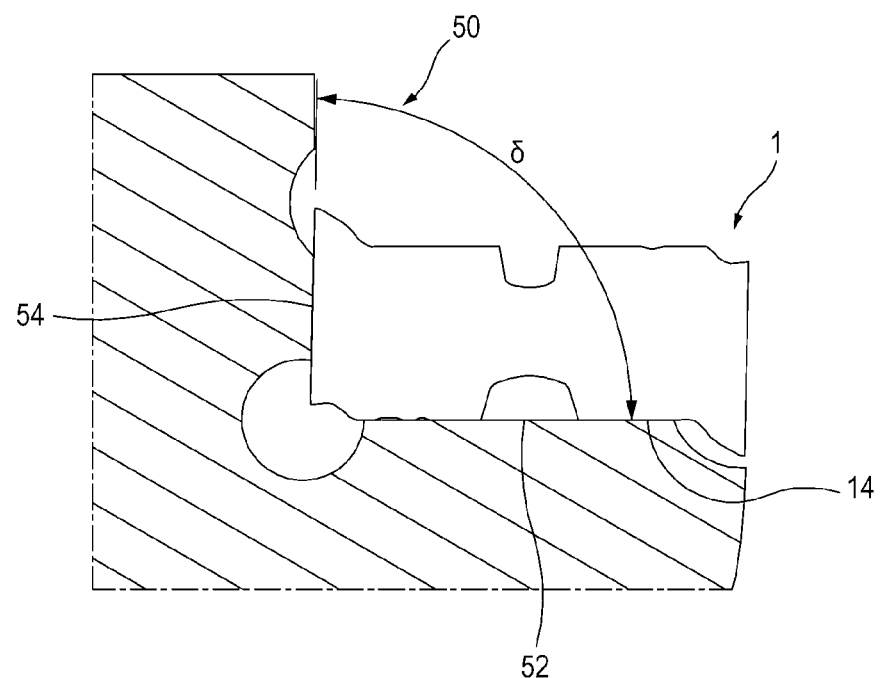
FIG. 13 is a schematic sectional view along the line XIII-XIII of FIG. 12.

FIG. 13 is a sectional view taken along the line XIII-XIII of FIG. 12. The cutting insert 1 is fixed to the insert pocket 50 of the tool holder 2a by a clamping means such as a screw insertable to the through bore 26 of the cutting insert 1. The insert pocket 50 of the tool holder 2a includes a base surface 52 and at least one side surface 54. The top face 12 or the bottom face 14 of the cutting insert 1 abuts the base surface 52 of the insert pocket 50, while the first sub-face 18 of the side face 16 of the cutting insert 1 abuts one side surface 54 of the insert pocket 50. Said at least one side surface 54, which the first sub-face 18 of the cutting insert 1 abuts, is inclined at an acute angle δ with respect to the base surface 52 of the insert pocket 50. Preferably, the first sub-face 18 of the cutting insert 1 comes into surface-to-surface abutment with the side surface 54 of the insert pocket 50. Thus, when the cutting insert 1 is urged in a radially inward direction of the tool holder 2a or upwardly in an axial direction of the tool holder 2a during cutting operations, the cutting insert 1 comes into close abutment with the insert pocket 50 and thus can be securely mounted on the insert pocket 50.

Figure 14:
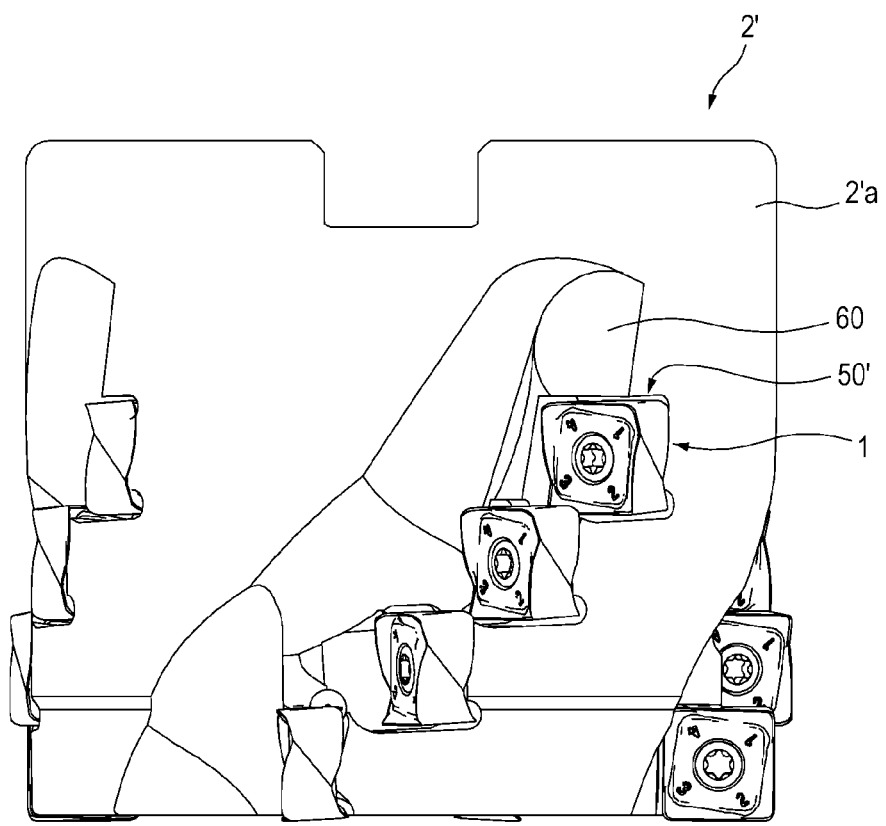
FIG. 14 shows a cutting tool for milling of an extended flute type, on which the cutting insert according to an embodiment is mounted.
Figure 15:
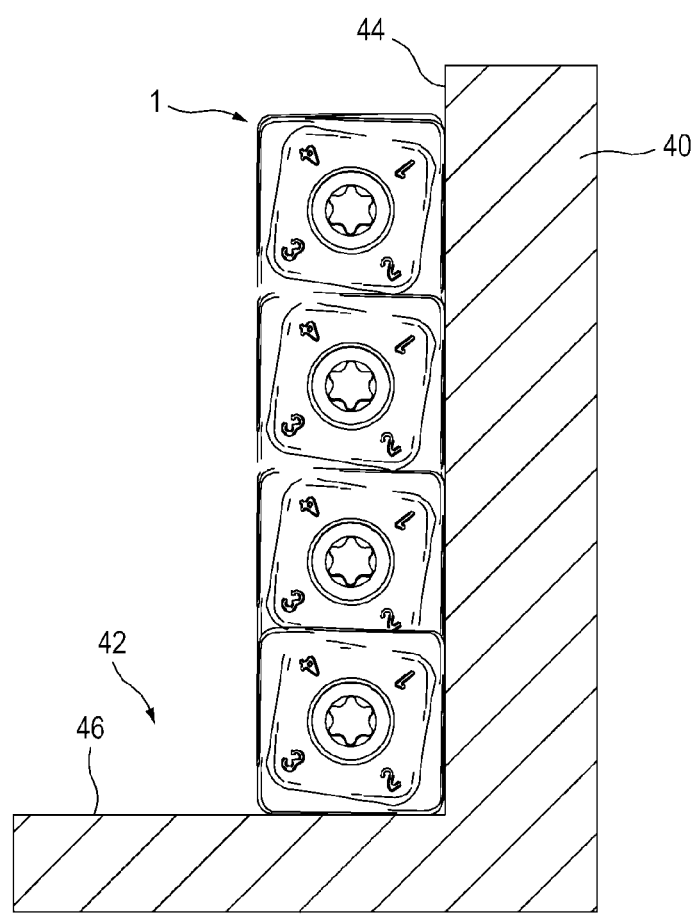
FIG. 15 schematically shows the operational disposition of the cutting inserts when the cutting tool shown in FIG. 14 cuts a workpiece.

FIG. 14 shows a cutting tool 2' for milling, wherein the cutting inserts 1 of the embodiment are mounted on a tool holder 2'a having extended flutes 60. FIG. 15 schematically shows the operational disposition of the cutting inserts 1 when the cutting tool 2' of this embodiment cuts a workpiece. To effectively cut a deeper right-angled shoulder in a workpiece, the tool holder 2'a formed with at least one helical flute 60 is used. A plurality of the cutting inserts 1 are mounted on a plurality of insert pockets 50' of one flute 60. As described above with reference to FIG. 12, the non-operative wiper edge 34' of the cutting insert 1 does not contact the upright wall 44 of the shoulder 42 during machining the shoulder in the workpiece 40. Thus, the cutting tool 2' on which a plurality of the cutting inserts 1 are mounted along the helical flute 60 is capable of cutting a deep right-angled shoulder.

While the present invention has been shown and described by way of the foregoing embodiments, the present invention should not be limited thereto. It will be apparent to those of ordinary skill in the art that various alternations or modifications may be made without departing from the scope of the present invention.

What is claimed is:

1. A double-sided cutting insert having eight main cutting edges and eight wiper edges, the cutting insert comprising:
    a square top face;
    a bottom face 180-degree rotationally symmetric with the top face;
    a normal axis (NA) passing normal to the top and bottom faces and defining a thickness direction of the cutting insert; and
    four side faces extending between the top face and the bottom face, each of the side face comprising:
    a first sub-face having a main cutting edge adjacent to the top face and a wiper edge opposed to the main cutting edge and adjacent to the bottom face; and
    a second sub-face having a wiper edge adjacent to the top face and a main cutting edge opposed to the wiper edge of the second sub-face and adjacent to the bottom face,
    wherein the first sub-face and the second sub-face are inclined with respect to each other in the thickness direction of the cutting insert such that the wiper edge of the second sub-face, when viewed from top, is inclined inwardly of the cutting insert with respect to the main cutting edge of the first sub-face, and that the wiper edge of the first sub-face, when viewed from bottom, is inclined inwardly of the cutting insert with respect to the main cutting edge of the second sub-face.

2. The cutting insert of claim 1, wherein the first sub-face and the second sub-face are inclined with respect to a normal axis of the top and bottom faces.

3. The cutting insert of claim 1, wherein the main cutting edge comprises a portion that becomes closer to the top face or the bottom face as the main cutting edge approaches to the wiper edge adjacent thereto when viewed from side.

4. A cutting tool for milling, comprising a tool holder and at least one double-sided cutting insert mounted on the tool holder,
    wherein the tool holder comprises at least one insert pocket for receiving said at least one double-sided cutting insert according to claim 1, the insert pocket having a base surface and at least one side surface.

5. The cutting tool of claim 4, wherein the first sub-face and the second sub-face are inclined with respect to a normal axis of the top and bottom faces, and
    wherein the first sub-face of the cutting insert abuts said at least one side surface of the insert pocket and said at least one side surface of the insert pocket is inclined at an acute angle with respect to the base surface of the insert pocket.

6. The cutting tool of claim 4, wherein the main cutting edge comprises a portion that becomes closer to the top face or the bottom face as the main cutting edge approaches to the wiper edge adjacent thereto when viewed from side.

7. The cutting tool of claim 4, wherein the tool holder comprises at least one extended flute having at least one insert pocket.

8. A double-sided cutting insert having eight main cutting edges and eight wiper edges, the cutting insert comprising:
a top face which is square in a top view;
a bottom face which is square in a bottom view;
four side faces extending between the top face and the bottom face;
a median plane (M) located between and equidistant from the top face and the bottom face;
a normal axis (NA) perpendicular to the median plane passing through the center of the top and bottom faces, the normal axis (NA) defining a thickness direction of the cutting insert;
a first axis (A1) lying along the median plane and passing through a first pair of opposite side faces; and
a second axis (A2) lying along the median plane (M) and passing through a second pair of opposite side faces, the first axis being perpendicular to the second axis;
wherein each of the side faces comprises:
a first sub-face having a main cutting edge adjacent to the top face and a wiper edge opposed to the main cutting edge and adjacent to the bottom face; and
a second sub-face having a wiper edge adjacent to the top face and a main cutting edge opposed to the wiper edge of the second sub-face and adjacent to the bottom face,
wherein the bottom face is 180-degree rotationally symmetric with the top face about both the first axis (A1) and the second axis (A2),
wherein the first sub-face and the second sub-face are inclined with respect to each other in the thickness direction of the cutting insert, such that the wiper edge of the second sub-face, when viewed from the top, is inclined inwardly of the cutting insert with respect to the main cutting edge of the first sub-face, and that the wiper edge of the first sub-face, when viewed from the bottom, is inclined inwardly of the cutting insert with respect to the main cutting edge of the second sub-face.

9. The cutting insert of claim 8, wherein the first sub-face and the second sub-face are inclined with respect to the normal axis of the top and bottom faces.

10. The cutting insert of claim 8, wherein, when viewed from the side, each main cutting edge comprises a portion that becomes closer to the top face or the bottom face as the main cutting edge approaches to the wiper edge on the same side face.

11. The cutting insert of claim 8, wherein the wiper edge of the second sub-face, when viewed from the top, is inclined inwardly of the cutting insert with respect to the main cutting edge of the first sub-face in a range of approximately 1 degree to approximately 3 degrees.

12. The cutting insert of claim 8, when viewed from the side, a boundary formed between the first sub-face and the second sub-face of each side face is oblique to the top face and the bottom face.

13. The cutting insert of claim 8, wherein:
the main cutting edge and the wiper edge of each side face meet at a transition point along each of the top and bottom faces; and
when viewed from the side, the transition points are the closest points along the main cutting edge and the wiper edge of both the top face and the bottom face to the median plane.

14. A cutting tool for milling, comprising:
a tool holder; and
at least one double-sided cutting insert according to claim 8 mounted on the tool holder,
wherein the tool holder comprises at least one insert pocket for receiving said at least one double-sided cutting insert, the insert pocket having a base surface and at least one side surface.

15. The cutting tool of claim 14, wherein the first sub-face and the second sub-face are inclined with respect to the normal axis of the top and bottom faces, and
wherein the first sub-face of the side face abuts said at least one side surface of the insert pocket and said at least one side surface of the insert pocket is inclined at an acute angle with respect to the base surface of the insert pocket.

16. The cutting tool of claim 14, wherein, when viewed from the top, each main cutting edge comprises a portion that becomes closer to the top face or the bottom face as the main cutting edge approaches to the wiper edge of the same side face.

17. The cutting tool of claim 14, wherein the tool holder comprises at least one extended flute having a plurality of insert pockets.

18. The cutting tool of claim 14, wherein the wiper edge of the second sub-face, when viewed from the top, is inclined inwardly of the cutting insert with respect to the main cutting edge of the first sub-face in a range of approximately 1 degree to approximately 3 degrees.

19. The cutting tool of claim 14, when viewed from the side, a boundary formed between the first sub-face and the second sub-face of each side face is oblique to the top face and the bottom face.

20. The cutting tool of claim 14, wherein the main cutting edge and the wiper edge of each side face meet at a transition point along each of the top and bottom faces,
wherein, when viewed from the side, the transition points are the closest points along the main cutting edge and the wiper edge of both the top face and the bottom face to the median plane.

21. A double-sided cutting insert for milling a shoulder into a workpiece, the cutting insert comprising:
a top face which is square in a top view;
a bottom face which is identical to the top face; and
a normal axis (NA) passing normal to the top and bottom faces and defining a thickness direction of the cutting insert; and
four side faces extending between the top face and the bottom face, each of the side faces comprising:
a first sub-face having a main cutting edge adjacent to the top face and a wiper edge opposed to the main cutting edge and adjacent to the bottom face; and
a second sub-face having a wiper edge adjacent to the top face and a main cutting edge opposed to the wiper edge of the second sub-face and adjacent to the bottom face,
wherein the first sub-face and the second sub-face are inclined with respect to each other in the thickness direction of the cutting insert such that, the wiper edges are inclined inwardly with respect to the main cutting edges in both the top and bottom views.

* * * * *